United States Patent
Sasajima et al.

[19]

[11] Patent Number: 5,804,937
[45] Date of Patent: Sep. 8, 1998

[54] VEHICLE DOOR OPERATING APPARATUS

[75] Inventors: Kouji Sasajima; Kiyohide Nagase; Takashi Kuribayashi, all of Wako, Japan

[73] Assignee: Honda Giken Kogyo Kabushiki Kaisha, Tokyo, Japan

[21] Appl. No.: 856,574

[22] Filed: May 15, 1997

[30] Foreign Application Priority Data

Jun. 7, 1996 [JP] Japan .................................. 8-146322

[51] Int. Cl.⁶ .......................................................... B60J 5/04
[52] U.S. Cl. ............................ 318/259; 318/280; 318/286; 318/266; 318/432
[58] Field of Search ..................................... 318/255–266, 318/268–272, 280, 283, 286, 432, 433; 49/31, 32, 139

[56] References Cited

U.S. PATENT DOCUMENTS

| | | | |
|---|---|---|---|
| 4,916,861 | 4/1990 | Schap | 49/31 |
| 5,434,487 | 7/1995 | Long et al. | 318/286 |

FOREIGN PATENT DOCUMENTS

| | | |
|---|---|---|
| 6-227252 A | 8/1994 | Japan . |
| 06328940 A | 11/1994 | Japan . |

*Primary Examiner*—Bentsu Ro
*Attorney, Agent, or Firm*—Merchant, Gould, Smith, Edell, Welter & Schmidt, P.A.

[57] ABSTRACT

A vehicle door operating apparatus includes a torque sensor or detecting torque applied to a knob of a vehicle door, a velocity sensor for detecting a moving velocity of the vehicle door, and a controller unit. The controller unit modifies a target current signal, corresponding to the detected torque, on the basis of an acceleration coefficient corresponding to an acceleration signal calculated from the moving velocity and a velocity coefficient corresponding to the moving velocity, to thereby generate a modified current signal. The apparatus provides a power assist to a opening/closing movement of the vehicle door, using the modified current signal. That is, the vehicle door operating apparatus generates a modified current signal on the basis of the target current signal corresponding to the detected torque, acceleration coefficient corresponding to the acceleration signal and velocity coefficient corresponding to the velocity signal, and drives a power-assist imparting electric motor on the basis of the modified current signal.

11 Claims, 10 Drawing Sheets

VEHICLE DOOR OPERATING APPARATUS

BACKGROUND OF THE INVENTION

1. Field of the Invention

The present relates generally to apparatuses for operating a door of a vehicle, and more particularly to a vehicle door operating apparatus which, responsive to a force applied by a human (driver, passenger or the like) to operate (open or close) a sliding door on the body of a motor vehicle, provides a power assist generated by an electric motor to thereby facilitate the opening/closing movement of the vehicle door.

2. Description of the Related Art

Japanese Patent Laid-open Publication No. HEI-6-227252 discloses an apparatus for operating (opening and closing) a door of a motor vehicle, in which a human-intention detector detects whether a human is intending to operate a vehicle door automatically or manually, so that a coupling unit is placed in an ON or Off condition depending on the detector's detection to thereby permit the intended automatic or manual opening/closing movement of the door. The disclosed vehicle door operating apparatus also includes a door position detector which constantly monitors a current position of the vehicle door irrespective of whether the door is being operated automatically or manually, and hence the door can be smoothly switched to the automatic operating condition once the door operating mode is shifted from the manual to automatic mode. However, because the vehicle door is only allowed to be fully opened or closed in the automatic operating mode, the disclosed vehicle door operating apparatus can not meet a users' need or demand for the door being slightly or slowly moved with an appropriately controlled power assist imparted, as a result of which the movement of the door tends to be an unnatural one that does not fit human feelings.

In another vehicle door operating apparatus disclosed in Japanese Patent Laid-open Publication No. HEI-6-328940, an operating force detector detects an operating force applied by a human to the vehicle door so that a power assist from an electric motor is adjusted in accordance with the detected operating force. Further, a velocity detector detects a velocity at which the door is moved to be opened or closed, so as to adjust or control the imparted power assist in accordance with the detected velocity. The power assist is increased when a door position detector detects that the door has reached a predetermined position. Because of the arrangement that a power assist is imparted to the door in accordance with a detected operating force applied to the door, breakdown or malfunctioning of the operating force detector would often result in a power assist being erroneously imparted to cause an automatic opening/closing movent of the vehicle door even when a human is not operating the door at all.

To prevent such an inconvenience due to breakdown of the operating force detector, it was necessary to constantly check the detector for presence of possible breakdown using a hardware or software checking facility, which would require complicated work and addition of extra hardware components, resulting in increased structural complexity and manufacturing cost of the apparatus.

Further, the conventional vehicle door operating apparatuses have the problems that an excessive operating force applied by a human would cause the moving velocity of the vehicle door to be much faster than actually needed and that it can not properly behave when the human puts his or her hand off (or stops depressing) the door knob during the opening or closing movement of the door. Thus, there has been a great need for a natural opening/closing movement of the vehicle door that well fits human feelings.

SUMMARY OF THE INVENTION

The present invention provides a vehicle door operating apparatus of the type which comprises a torque sensor for detecting torque applied to a knob of a vehicle door to generate a torque signal, an electric motor for imparting a power assist to an opening/closing movement of the vehicle door, and a controller unit for controlling the electric motor on the basis of at least the torque signal generated by the torque sensor. The vehicle door operating apparatus also includes a velocity sensor for detecting a moving velocity of the vehicle door to generate a velocity signal. The controller unit includes a target current signal setting section for generating a target current signal corresponding to the torque signal, an acceleration calculating section for performing an arithmetic operation to differentiate the velocity signal generated by the velocity sensor so as to generate an acceleration signal, an acceleration coefficient generating section for generating an acceleration coefficient corresponding to the acceleration signal generated by the acceleration calculating section, and a velocity coefficient generating section for generating a velocity coefficient corresponding to the velocity signal. The controller unit also includes a modifying section for modifying the target current signal on the basis of the acceleration coefficient and velocity coefficient so as to generate a modified current signal, and a drive control section for generating a control signal on the basis of the modified current signal generated by the modifying section.

In another aspect of the present invention, the controller unit includes, in addition to the target current signal setting section for generating a target current signal corresponding to the torque signal, a driving/braking velocity coefficient generating section for outputting a positive velocity coefficient when the velocity signal is not greater than a predetermined value but outputting a negative velocity coefficient when the velocity signal exceeds the predetermined value. Thus, the modifying section modifies the target current signal on the basis of the velocity coefficient so as to generate a modified current signal, and the drive control section generates a control signal on the basis of the modified current signal generated by the modifying section.

In still another aspect of the present invention, the vehicle door operating apparatus includes a position sensor for detecting a position of the vehicle door, in addition to the torque sensor and velocity sensor. The controller unit includes, in addition to the target current signal setting section, a velocity coefficient generating section for generating a velocity coefficient corresponding to the velocity signal, a modifying section for modifying the target current signal on the basis of the velocity coefficient so as to generate a modified current signal, a drive control section for generating a control signal on the basis of the modified current signal generated by the modifying section, and an inertia velocity control section for controlling a moving velocity of the vehicle door when a human stops depressing the knob of the vehicle door during an opening/closing movement of the vehicle door.

The inertia velocity control section preferably includes an inertia mode determinator for determining that the opening/closing movement of the vehicle door is in an inertial mode, a target inertia current signal generator for generating a standard current signal corresponding to a target velocity for the inertia mode, an offset current signal generator for generating an offset current signal corresponding to a difference between the velocity signal and the target velocity, and an attenuating current signal generator for generating an attenuating current signal to attenuate the velocity signal to a value 0. When the torque signal is of value 0 and the velocity signal is greater than a reference value, the electric motor is driven on the basis of the standard current signal and offset current signal, but when the torque signal is of value 0 and the velocity signal is not greater than the reference value, the electric motor is driven on the basis of the attenuating current signal.

The inertia velocity control section may include a coinciding current signal generator for generating a coinciding current signal to allow the velocity signal to coincide with a reference velocity when the vehicle door is at a predetermined position, and a setting current signal generator for generating a setting current signal to set attenuation of the velocity signal, not greater than the reference velocity, to a predetermined attenuation pattern. When the torque signal is of value 0 and the velocity signal is greater than the reference velocity, the electric motor is driven first on the basis of the coinciding current signal and then on the basis of the setting current signal.

BRIEF DESCRIPTION OF THE ACCOMPANYING DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

A vehicle door operating apparatus in accordance with the present invention is directed to affording a natural opening/closing movement of a motor vehicle door that well fits human feelings. To this end, the vehicle door operating apparatus is arranged to provide a power assist generated from an electric motor to an opening/closing movement of the vehicle door, by driving the motor on the basis of detection of an operating force (torque) applied to the door and moving velocity and acceleration of the door, as will be described in detail below.

Figure 1:
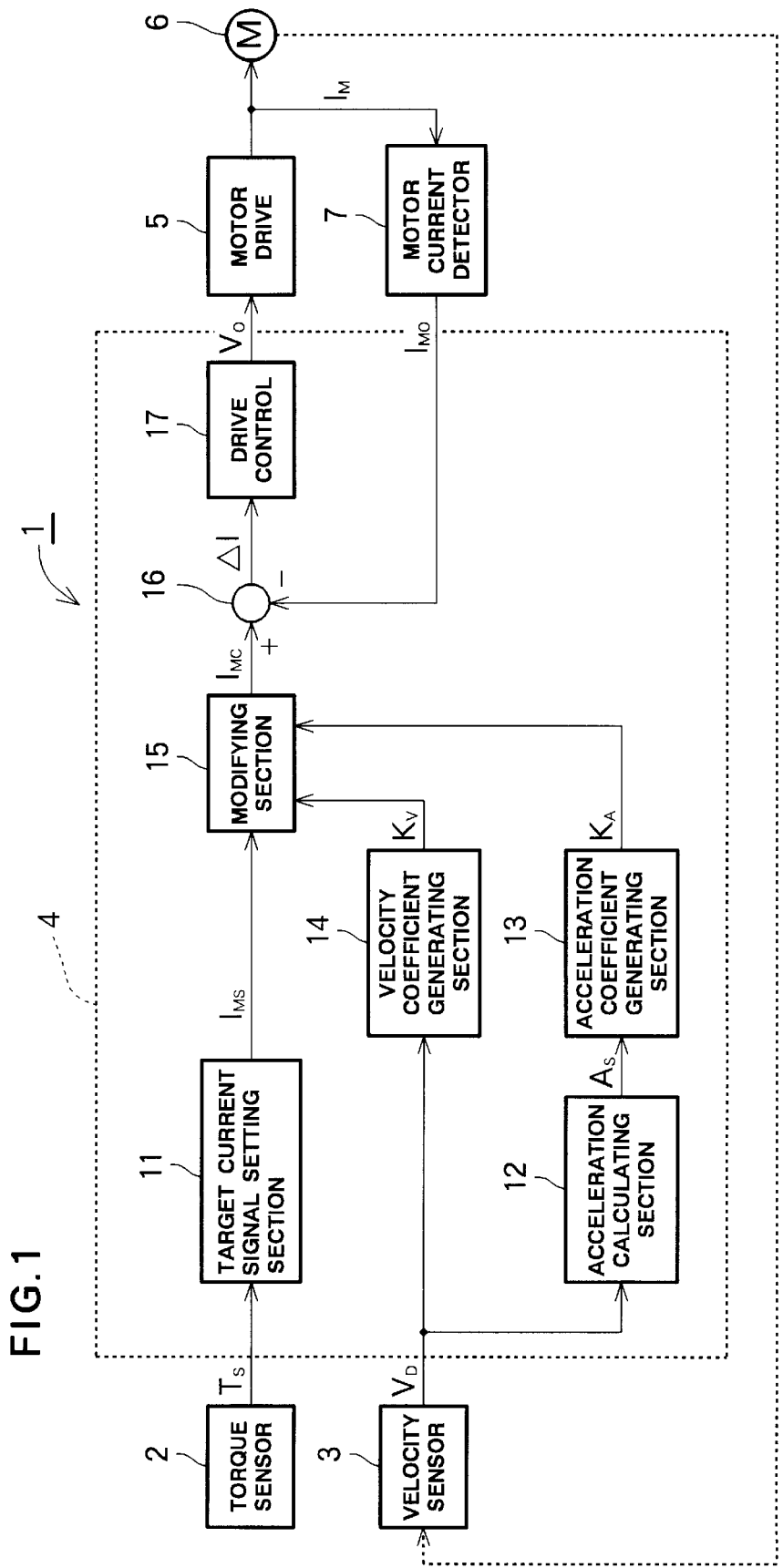
FIG. 1 is a block diagram illustrating an overall arrangement of a vehicle door operating apparatus in accordance with a first embodiment of the present invention.

FIG. 1 is a block diagram illustrating an overall arrangement of the vehicle door operating apparatus 1 in accordance with a first embodiment of the present invention. The vehicle door operating apparatus 1 includes a torque sensor 2 for detecting an operating force (torque) applied to the knob of the vehicle door (not shown) to generate electrical torque signal $T_S$ in analog form representative of the detected operating force, a velocity sensor 3 for detecting a moving velocity of the vehicle door to generate pulsed velocity signal $V_D$ representative of the detected velocity, and an electric motor 6 for imparting a power assist to the opening/closing movement of the vehicle door. The vehicle door operating apparatus 1 also includes a controller unit 4 for controlling the overall operation of the apparatus, a motor drive 5 for driving the electric motor 6 on the basis of control signal $V_O$ from the controller unit 4, and a motor current detector 7 for detecting motor current $I_M$ actually flowing through the motor 6 to generate motor current signal $I_{MO}$ representative of the detected motor current.

The torque sensor 2 comprises, for example, a potentiometer, which produces a voltage corresponding to the operating force applied to the vehicle door knob and supplies analog torque signal $T_S$ to the controller unit 4. The velocity sensor 3 comprises, for example, an encoder, which produces electrical pulses corresponding to the number of rotations of the power-assist imparting electric motor 6 and supplies velocity signal $V_D$ to the controller unit 4.

The controller unit 4, which basically comprises a microprocessor, an arithmetic section, a processing section, a memory, etc., includes a target current signal setting section 11, an acceleration calculating section 12, an acceleration coefficient generating section 13, a velocity coefficient generating section 14, a modifying section 15, an offset calculating section 16 and a drive control section 17.

Figure 3:
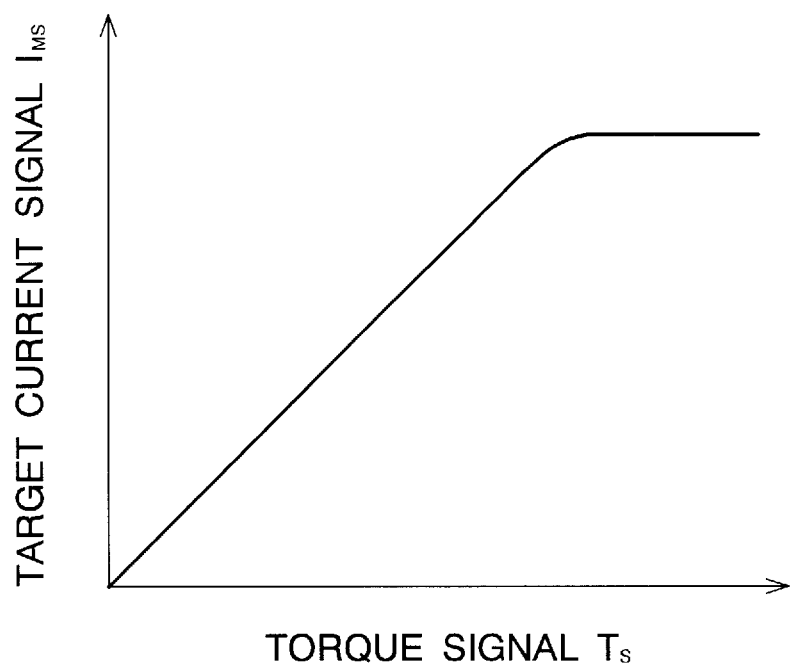
FIG. 3 is a graph illustrating control characteristics of torque signal $T_S$ vs target current signal $I_{MS}$ used in the first embodiment.

The target current signal setting section 11 includes a memory, such as a ROM, prestoring a table of torque signal $T_S$ vs target current signal $I_{MS}$ relationship as shown in FIG. 3 which is prepared on the basis of values obtained theoretically or empirically. The target current signal setting section 11 reads out a value of the target current signal $I_{MS}$ corresponding to a digitally-converted value of torque signal $T_S$ supplied from the torque sensor 2, and the read-out target current signal value $I_{MS}$ is fed from the setting section 11 to the modifying section 15. As shown in FIG. 3, the target current sinal $I_{MS}$ corresponding to the torque signal $T_S$ is used to drive the electric motor 6 and is set to a characteristic such that its value increases linearly as that of the torque signal $T_S$ increases and gets saturated to a given value after the torque signal $T_S$ reaches a predetermined magnitude value.

The acceleration calculating section 12 has an arithmetic function to differentiate a digitally-converted value $V_D$ of velocity signal $V_D$ supplied from the velocity sensor 3 and feeds a resultant acceleration signal $A_S$ to the acceleration coefficient generating section 13. In this manner, the acceleration calculating section 12 can arithmetically determine an acceleration value of the door from its moving velocity.

Figure 4:
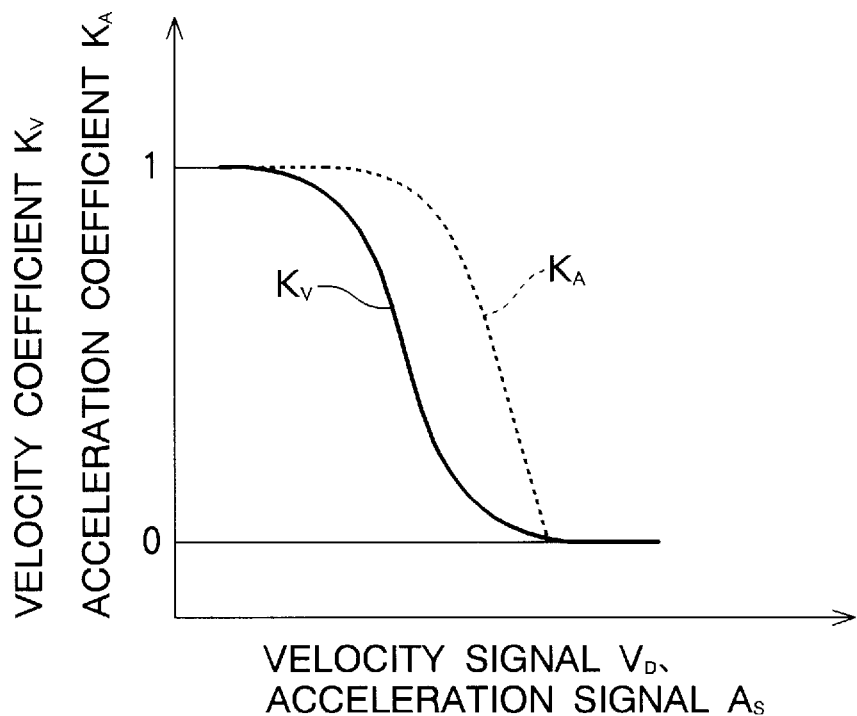
FIG. 4 is a graph illustrating control characteristics of acceleration signal $A_S$ vs acceleration coefficient $K_A$ used in the first embodiment.

The acceleration coefficient generating section 13 includes a memory, such as a ROM, prestoring a table of acceleration signal $A_S$ vs acceleration coefficient $K_A$ relationship as shown in FIG. 4 which is prepared on the basis of values obtained theoretically or empirically. The acceleration coefficient generating section 13 reads out acceleration coefficient $K_A$ corresponding to the acceleration signal $A_S$ supplied from the acceleration calculating section 12, and the read-out acceleration coefficient $K_A$ is fed from the generating section 13 to the modifying section 15. As shown in FIG. 4, the acceleration coefficient $K_A$ is set to a value within a range from "0" to "1"; that is, it is set to take a value "1" ($K_A=1$) when the acceleration signal $A_S$ is within a range from "0" to a predetermined value and gradually decrease from "1" to "0" ($K_A=0$) as the acceleration signal $A_S$ increases beyond the predetermined value.

Like the acceleration coefficient generating section 13, the velocity coefficient generating section 14 includes a memory, such as a ROM, prestoring a table of velocity signal $V_D$ vs velocity coefficient $K_V$ (solid line) relationship of FIG. 4 which is prepared on the basis of values obtained theoretically or empirically. The velocity coefficient generating section 14 reads out velocity coefficient $K_V$ corresponding to a digitally-converted value of the velocity signal $V_D$ supplied from the velocity sensor 3, and the read-out velocity coefficient $K_V$ is fed from the generating section 14 to the modifying section 15. As shown in FIG. 4, the velocity coefficient $K_V$ is set to a value within a range from "0" to "1"; that is, it is set to take a value "1" ($K_V=1$) when the velocity signal $V_D$ is within a range from "0" to a predetermined value and gradually decrease from "1" to "0" ($K_V=0$) as the velocity signal $V_D$ increases beyond the predetermined value.

The modifying section 15 modifies or attenuates the target current signal $I_{MS}$, fed from the target current signal setting section 11, with the acceleration coefficient $K_A$ fed from the acceleration coefficient generating section 13 and velocity coefficient $K_V$ fed from the velocity coefficient generating section 14. The modifying section 15 supplies a resultant modified current signal $I_{MC}$ to the offset calculating section 16.

Figure 2:
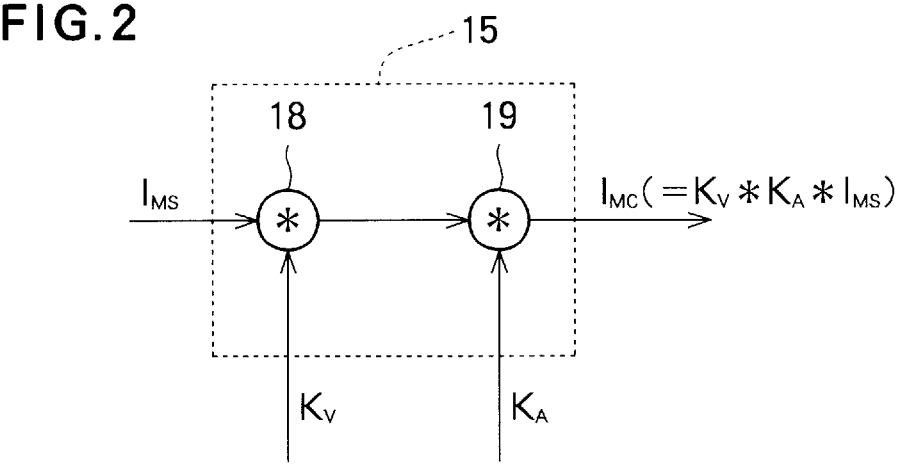
FIG. 2 is a diagram showing a detailed example of a modifying section shown in FIG. 1.

FIG. 2 is a diagram showing a detailed example of the modifying section 15 of FIG. 1. As shown, the modifying section 15 includes first and second multipliers 18 and 19. The first modifier 18 performs a multiplication between the target current signal $I_{MS}$ and the velocity coefficient $K_V$ ($K_V*I_{MS}$) the second modifier 19 performs a multiplication between the multiplication result from the first modifier 18 and the acceleration coefficient $K_A$ ($K_V*K_A*I_{MS}$) to generate modified current signal $I_{MC}$ ($=K_V*K_A*I_{MS}$) that is then fed to the offset calculating section 16.

Because the velocity coefficient $K_V$ and acceleration coefficient $K_A$ are both smaller than "1" as shown in FIG. 4, the modifying section 15 can generate modified current signal $I_{MC}$ that is resultant from attenuating the target current signal $I_{MS}$ with increasing absolute values of the velocity coefficient $K_V$ and acceleration coefficient $K_A$ ($I_{MC} \leq I_{MS}$) Further, the modified current signal $I_{MC}$ ($=K_V*K_A*I_{MS}$) is output in a finite value ($I_{MC}>0$) only when the target current signal $I_{MS}$, velocity coefficient $K_V$ and acceleration coefficient $K_A$ are all simultaneously fed to the modifying section 15 in finite values.

Note that if either the velocity signal $V_D$ or the acceleration signal $A_S$ is "0" with the target current signal $I_{MS}$ being of finite value ($I_{MS}>0$), the modifying section 15 outputs no effective modified current signal $I_{MC}$ ($I_{MC}=0$), i.e., output of the modified current signal $I_{MC}$ is inhibited. Thus, if either the velocity coefficient $K_V$ or the acceleration coefficient $K_A$ is "0" with the target current signal $I_{MS}$ being of finite value ($I_{MS}>0$), the modifying section 15 outputs no effective modified current signal $I_{MC}$ ($I_{MC}=0$), i.e., output of the modified current signal $I_{MC}$ is inhibited.

Figure 5:
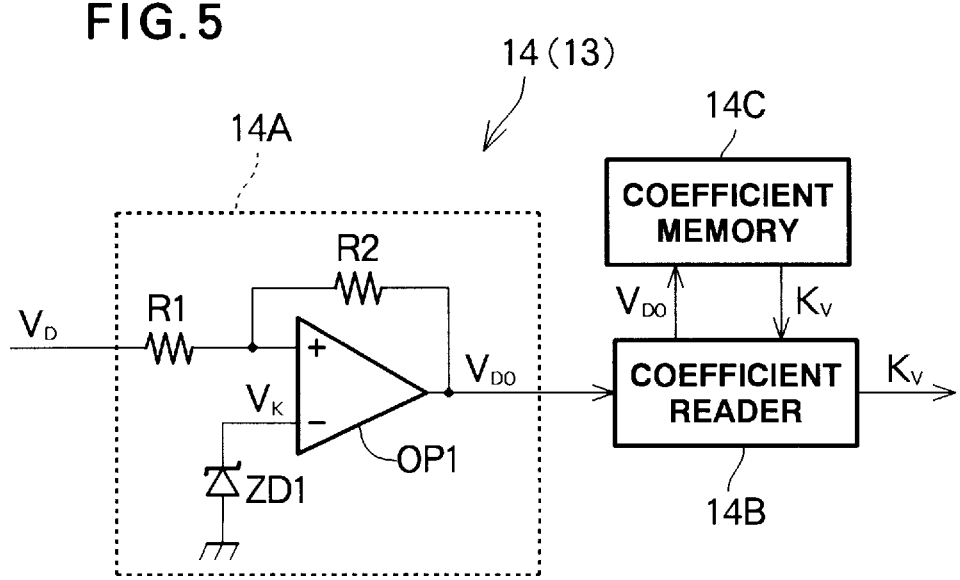
FIG. 5 is a diagram showing a detailed example of a velocity coefficient generating section or acceleration coefficient generating section shown in FIG. 1.

FIG. 5 is a diagram showing a detailed example of the velocity coefficient generating section 14, which includes a comparator 14A, a velocity coefficient reader 14B and a coefficient memory 14C. The comparator 14A comprises an operational amplifier OP1 having Zener voltage of a constant voltage element ZD1 preset as its reference value $V_K$, and when the velocity signal $V_D$ is greater than the reference value $V_K$ ($V_D>V_K$), the comparator 14A supplies the velocity coefficient reader 14B with comparison signal $V_{D0}$ corresponding to a difference between the velocity signal $V_D$ and the reference value $V_K$ ($V_D-V_K$). When the velocity signal $V_D$ is equivalent to or smaller than the reference value $V_K$ ($V_D<V_K$), the comparator 14A supplies the velocity coefficient reader 14B with comparison signal $V_{D0}$ of value "0".

On the basis of the comparison signal $V_{D0}$ supplied from the comparator 14A, the velocity coefficient reader 14B accesses the coefficient memory 14C to read out therefrom velocity coefficient $K_V$ preset in corresponding relation to the comparison signal $V_{D0}$. The coefficient memory 14C may comprise a ROM or the like prestoring the characteristic curve of velocity signal $V_D$ vs velocity coefficient $K_V$ relationship shown in FIG. 4. If the gain (−R2/R1) of the comparator 14A is set such that the comparison signal $V_{D0}$ coincides in value with the velocity signal $V_D$ when the velocity signal $V_D$ is greater than the reference value $V_K$, then velocity coefficient $K_V$ remains at "0" until the velocity signal $V_D$ equals the reference value $V_K$ as shown in a relationship between velocity signal $V_D$ and velocity coefficient $K_V$ of FIG. 6.

Figure 6:
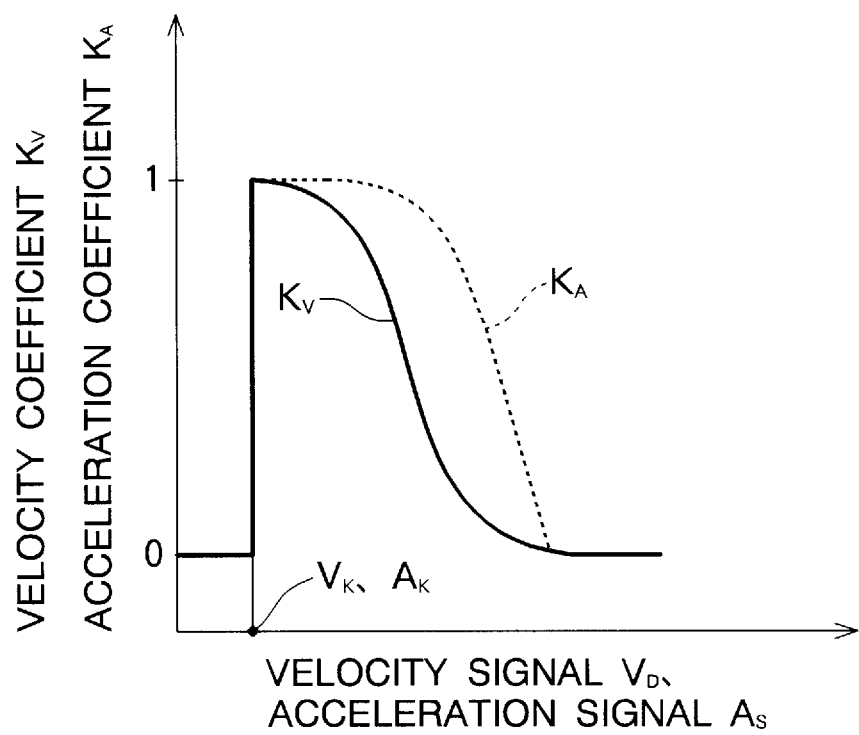
FIG. 6 is a graph illustrating control characteristics of velocity signal $V_D$ vs velocity coefficient $K_V$ and acceleration signal $A_S$ vs acceleration coefficient $K_A$ used in the first embodiment.
Figure 15:
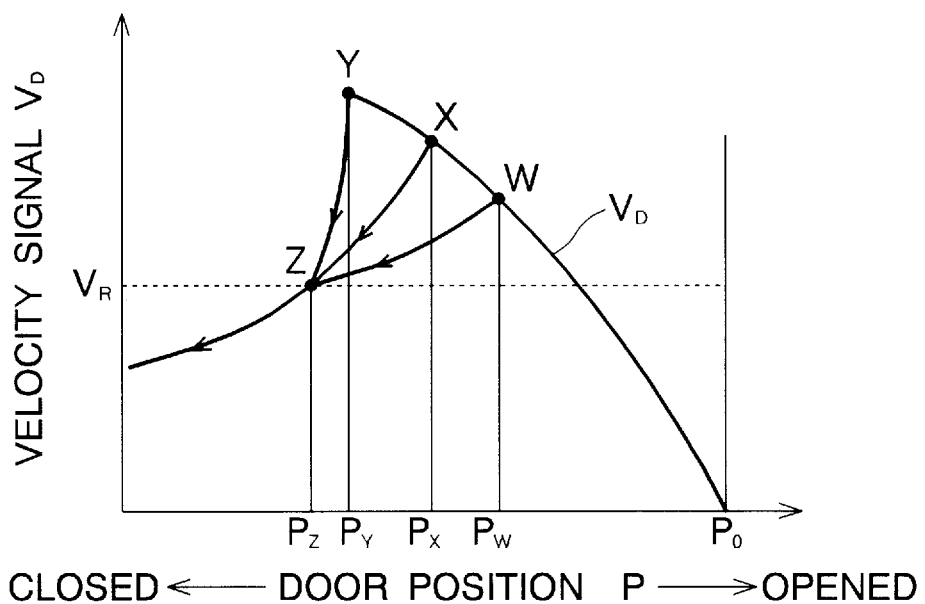
FIG. 15 is a graph illustrating control characteristics of door position P vs velocity signal $V_D$ used for inertia velocity control in the third embodiment.

The characteristic curve, defining a relationship between acceleration signal $A_S$ and acceleration coefficient $K_A$, of FIG. 6 is achieved by arranging the acceleration coefficient generating section 13 in the same manner as the velocity coefficient generating section 14 of FIG. 15 and setting a reference value $A_K$ therein.

The offset calculating section 16 comprises a subtracter, which calculates a difference or offset value $\Delta I$ between the modified current signal $I_{MC}$ ($=K_V*K_A*I_{MS}$) from the modifying section 15 and the motor current signal $I_{M0}$ from the motor current detector 7 and feed the calculated offset value $\Delta I$ ($=I_{MC}-I_{M0}$) to the drive control section 17. The drive control section 17 includes a PID (Proportional, Integral and Differential) controller and a PWM (Pulse-Width-Modulated) control signal generator. The drive control section 17 performs PID control on the offset signal $\Delta I$ ($=I_{MC}-I_{M0}$) and then supplies the motor drive 5 with a PWM control signal corresponding to the offset signal ΔI (=$I_{MC}$−$I_{M0}$). In such a manner that the motor current signal $I_{M0}$ equals the modified current signal $I_{MC}$, the drive control section 17 controls the offset signal ΔI (=$I_{MC}$−$I_{M0}$) to promptly become zero ($I_{MC}$=$I_{M0}$).

The motor drive 5 comprises, for example, a bridge circuit formed of four power FETs (Field Effect Transistors), and one pair of the diagonally opposed FETs are driven by an ON signal and PWM signal with the other pair of the the diagonally opposed FETs being given an OFF signal. This way, the motor drive 5 drives the electric motor 6 with motor current $I_M$ corresponding to the offset signal ΔI.

The motor current detector 7 detects motor current $I_M$ flowing through the electric motor 6, converts the detected motor current $I_M$ into a digital motor current signal $I_{M0}$, and feeds the converted digital motor current signal $I_{M0}$ back to the offset calculating section 16 (negative feedback). When the motor current signal $I_{M0}$ equals the modified current signal $I_{MC}$ and hence the offset signal ΔI becomes zero, the electric motor 6 is driven with the set motor current $I_M$.

As described above, the vehicle door operating apparatus 1 according to the first embodiment of FIG. 1 is arranged to generate modified current signal $I_{MC}$ based on target current signal $I_{MS}$ corresponding to torque signal $T_S$, acceleration coefficient $K_A$ corresponding to acceleration signal $A_S$ and velocity coefficient $K_V$ corresponding to velocity signal $V_D$, and drive the electric motor 6 in accordance with the modified current signal $I_{MC}$ to yield a power assist to the opening/closing movement of the vehicle door.

Further, because the modifying section 15 in the embodiment is arranged to output the modified current signal $I_{MC}$ only when the target current signal $I_{MS}$, acceleration coefficient $K_A$ and velocity coefficient $K_V$, no modified current signal $I_{MC}$ is output to thereby inhibit impartment of the power assist to the opening/closing movement of the vehicle door.

Moreover, because of the arrangement that the acceleration coefficient generating section 13 and velocity coefficient generating section 14 output acceleration coefficient $K_A$ and velocity coefficient $K_V$ that decrease in value in response to increase in the values of acceleration signal $A_S$ and velocity signal $V_D$, respectively, the power assist can be controlled to properly limit the door velocity even when the door is operated with a great or abruptly changing force.

Furthermore, because the acceleration coefficient generating section 13 and velocity coefficient generating section 14 are each provided with the comparator 14A and set the acceleration coefficient $K_A$ and velocity coefficient $K_V$ to zero when the acceleration signal $A_S$ and velocity signal $V_D$ are not greater than predetermined values, a power assist can be imparted only after the door has start moving steadily.

Figure 7:
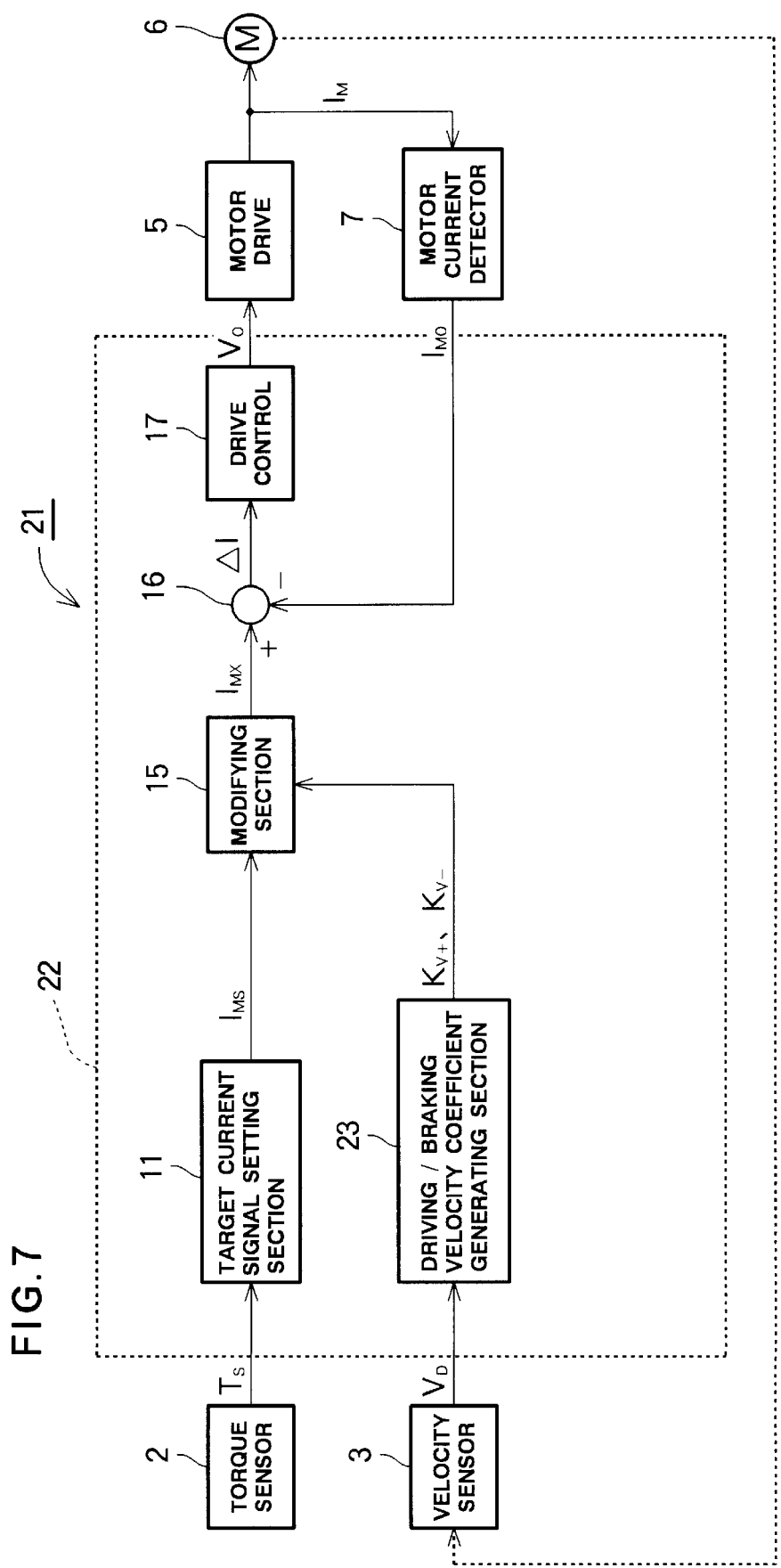
FIG. 7 is a block diagram illustrating an overall arrangement of a vehicle door operating apparatus in accordance with a second embodiment of the present invention.

FIG. 7 is a block diagram illustrating an overall arrangement of a vehicle door operating apparatus 21 in accordance with a second embodiment of the present invention. The vehicle door operating apparatus 21 in accordance with the second embodiment is arranged to achieve a natural opening/closing movement of the vehicle door, by rotating the power-assist imparting electric motor in the reverse direction to limit the door velocity when an opening/closing force applied to the door is excessive.

This vehicle door operating apparatus 21 comprises a controller unit 22 which includes a target current signal setting section 11, a driving/braking velocity coefficient generating section 23, a modifying section 15, an offset calculating section 16 and a drive control section 17. A torque sensor 2, velocity sensor 3, motor drive 5 and motor current detector 7 in the second embodiment of FIG. 7 are the same in structure and behavior as the counterparts in the first embodiment of FIG. 1 and hence will not be described in detail here to avoid unnecessary duplication. Also, the target current signal setting section 11, offset calculating section 16 and drive control section 17 in the second embodiment are the same in structure and behavior as the counterparts in the first embodiment and hence will not be described in detail here.

The driving/braking velocity coefficient generating section 23 includes a memory, such as a ROM, prestoring a characteristic curve defining a relationship between velocity signal $V_D$ and driving/braking velocity coefficients $K_{V+}$, $K_{V-}$ which is preset on the basis of values obtained theoretically or empirically. The driving/braking velocity coefficient generating section 23 reads out driving/braking velocity coefficient $K_{V+}$, $K_{V-}$ corresponding to a digitally-converted value of velocity signal $V_D$ supplied from the velocity sensor 3 and feeds the read-out coefficient $K_{V+}$, $K_{V-}$ to the modifying section 15.

Figure 9:
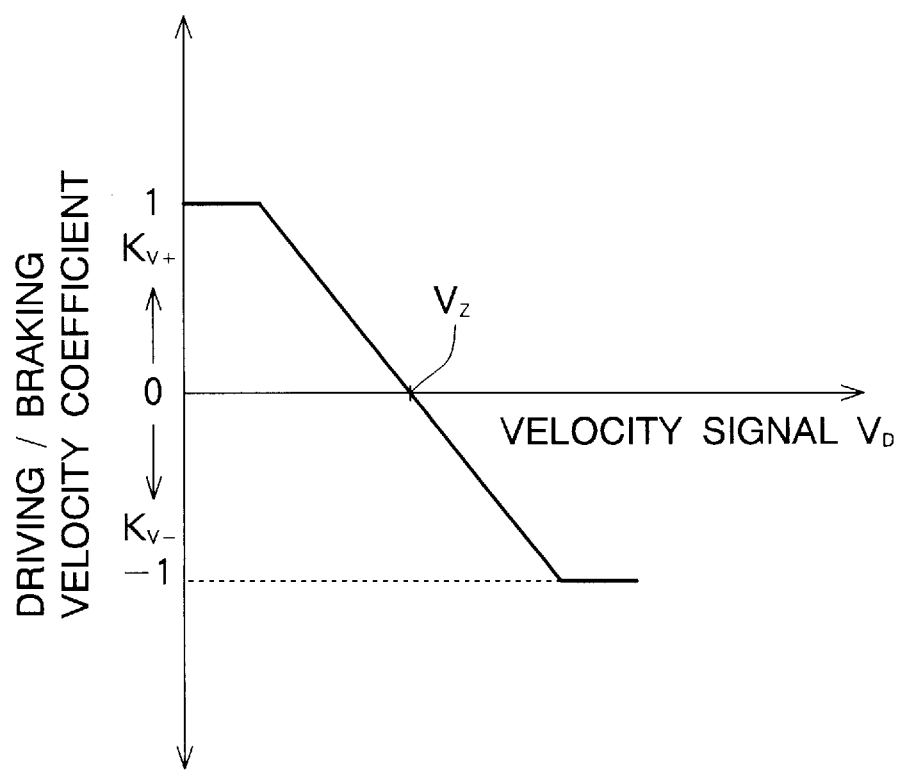
FIG. 9 is a graph illustrating control characteristics of velocity signal $V_D$ vs driving/braking velocity coefficient $K_{V+}$, $K_{V-}$ used in the second embodiment.

Thus, as shown in FIG. 9, the driving/braking velocity coefficient generating section 23 can generate positive (plus) driving/braking velocity coefficient $K_{V+}$ that, for a variation region of the velocity signal $V_D$ from a value "0" to a predetermined value $V_Z$, first decreases linearly from an initial value "1" and then reaches "0", and negative (minus) driving/braking velocity coefficient $K_V$ that takes a value "0" at the predetermined velocity value $V_Z$ and then decreases linearly from "0" to "−1" for a variation region of the velocity signal $V_D$ exceeding the predetermined velocity value $V_Z$.

Figure 8:
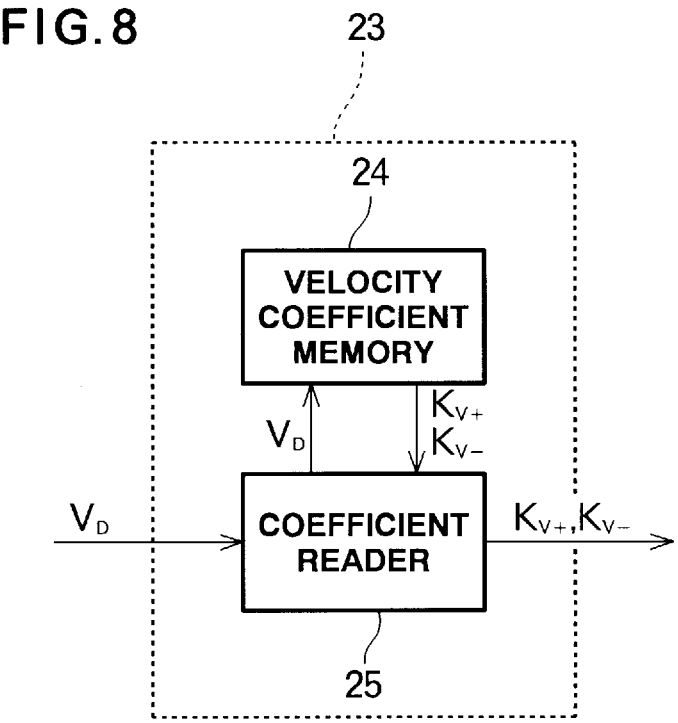
FIG. 8 is a diagram showing a detailed example of a driving/braking velocity coefficient generating section shown in FIG. 7.

FIG. 8 is a block diagram showing a detailed example of the driving/braking velocity coefficient generating section 23, which includes a velocity coefficient memory 24 and a coefficient reader 25. The velocity coefficient memory 24 comprises a memory, such as a ROM, prestoring a set of driving/braking velocity coefficients $K_{V+}$ and $K_{V-}$ as explained earlier in relation to FIG. 9. In response to velocity signal $V_D$ supplied from the velocity sensor 3, the coefficient reader 25 accesses the velocity coefficient memory 24 to read out positive or negative driving/braking velocity coefficient $K_{V+}$ or $K_{V-}$ corresponding to the supplied velocity signal $V_D$ and then feeds the read-out coefficient $K_{V+}$ or $K_{V-}$ to the modifying section 15.

The modifying section 15 includes a multiplier that performs a multiplication between the target current signal $I_{MS}$ from the target current signal setting section 11 and the positive or negative driving/braking velocity coefficient $K_{V+}$ or $K_{V-}$ from the coefficient generating section 23 ($K_{V+}*I_{MS}$ or $K_{V-}*I_{MS}$), so as to generate modified current signal $I_{MX}$ that is a result of attenuating the target current signal $I_{MS}$ with the driving/braking velocity coefficient $K_{V+}$ or $K_{V-}$. The modifying section 15 feeds the generated modified current signal $I_{MX}$ to the offset calculating section 16.

Figure 10A:
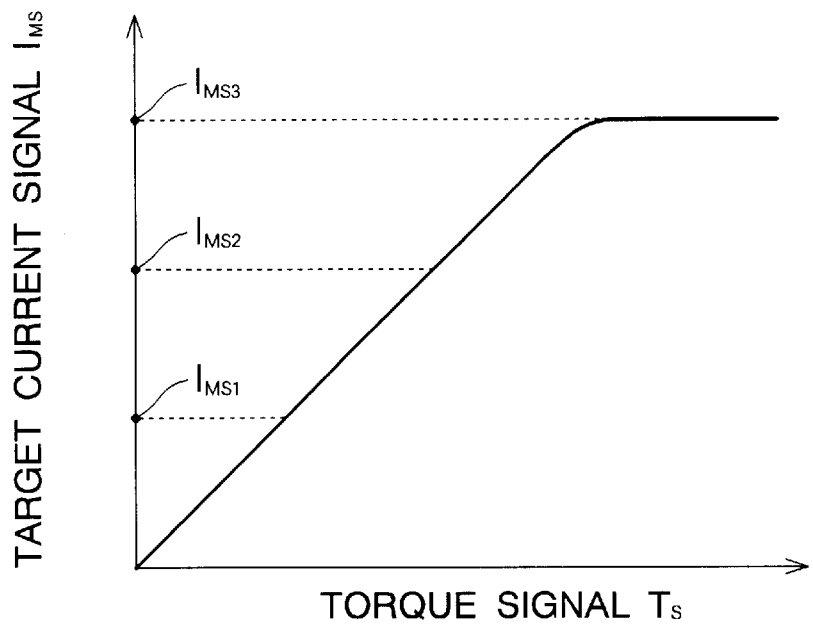
FIG. 10A is a graph illustrating control characteristics of torque signal $T_S$ vs target current signal $I_{MS}$ used in the second embodiment.
Figure 10B:
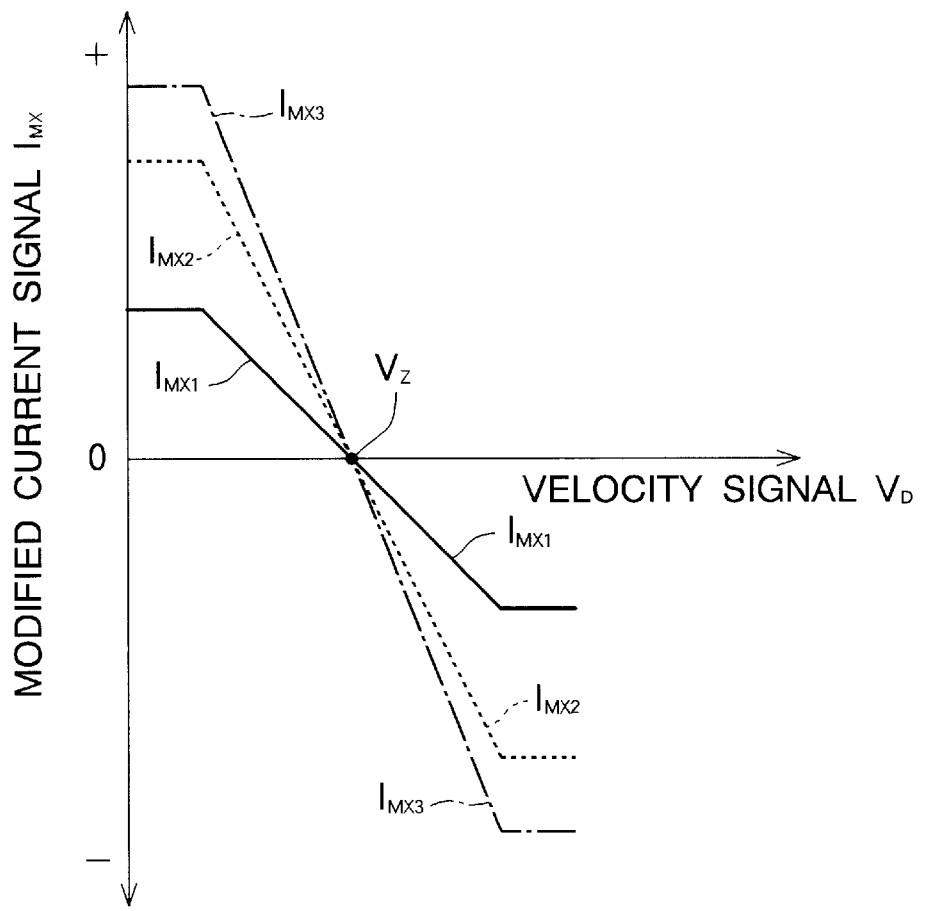
FIG. 10B is a graph illustrating control characteristics of velocity signal $V_D$ vs modified current signal $I_{MX}$ used in the second embodiment.

FIG. 10A is a graph illustrating a characteristic curve of relationship between torque signal $T_S$ and target current signal $I_{MS}$ that is used for control in the second embodiment, showing three target current signals $I_{MS1}$, $I_{MS2}$ and $I_{MS3}$ corresponding to the torque signal $T_S$. FIG. 10B is a graph illustrating characteristic curves of modified current signals $I_{MX1}$, $I_{MX2}$ and $I_{MX3}$ obtained by attenuating the target current signals $I_{MS1}$, $I_{MS2}$ and $I_{MS3}$ of FIG. 10A with the driving/braking velocity coefficient $K_{V+}$ or $K_{V-}$.

Because the driving/braking velocity coefficient $K_{V+}$ or $K_{V-}$ decreases in value as the value of the velocity signal $V_D$ increases in response to the individual target current signals $I_{MS1}$, $I_{MS2}$ and $I_{MS3}$, the electric motor 6 can be driven on the basis of any of the modified current signals $I_{MX1}$, $I_{MX2}$ and $I_{MX3}$ so that the door is braked as its moving velocity increases. Particularly, once the velocity signal $V_D$ exceeds the predetermined velocity value $V_Z$ ($V_D > V_Z$), the modified current signal $I_{MX1}$, $I_{MX2}$, $I_{MX3}$ turns into negative polarity, so that the electric motor 6 is driven in the reverse direction so as to impart a negative power assist, which is of opposite direction to the moving direction of the vehicle door, to thereby brake the door. Further, because the modified current signals $I_{MX1}$, $I_{MX2}$, $I_{MX3}$ can be changed by optionally varying the set value of the driving/braking velocity coefficient $K_{V+}$ or $K_{V-}$, it is possible to set any desired door braking characteristic.

By virtue of the provision of the above-described driving/braking velocity coefficient generating section 23 which outputs a positive driving/braking velocity coefficient $K_{V+}$ when the velocity signal $V_D$ is not greater than the predetermined velocity value $V_Z$ but outputs a negative driving/braking velocity coefficient $K_{V-}$ once the velocity signal $V_D$ exceeds the predetermined velocity value $V_Z$, the vehicle door operating apparatus 21 in accordance with the a second embodiment of FIG. 7 can appropriately brake (i.e., limit the velocity of) the moving vehicle door by driving the electric motor 6 in the reverse direction once the door velocity $V_D$ exceeds the predetermined velocity value $V_Z$.

Further, because the driving/braking velocity coefficient generating section 23 includes the velocity coefficient memory 24 prestoring a set of driving/braking velocity coefficients $K_{V+}$ and $K_{V-}$ corresponding to possible variations of the velocity signal $V_D$, it is possible to achieve a desired door-velocity limiting characteristic by just changing the setting of the velocity coefficient $K_{V+}$ or $K_{V-}$.

Figure 11:
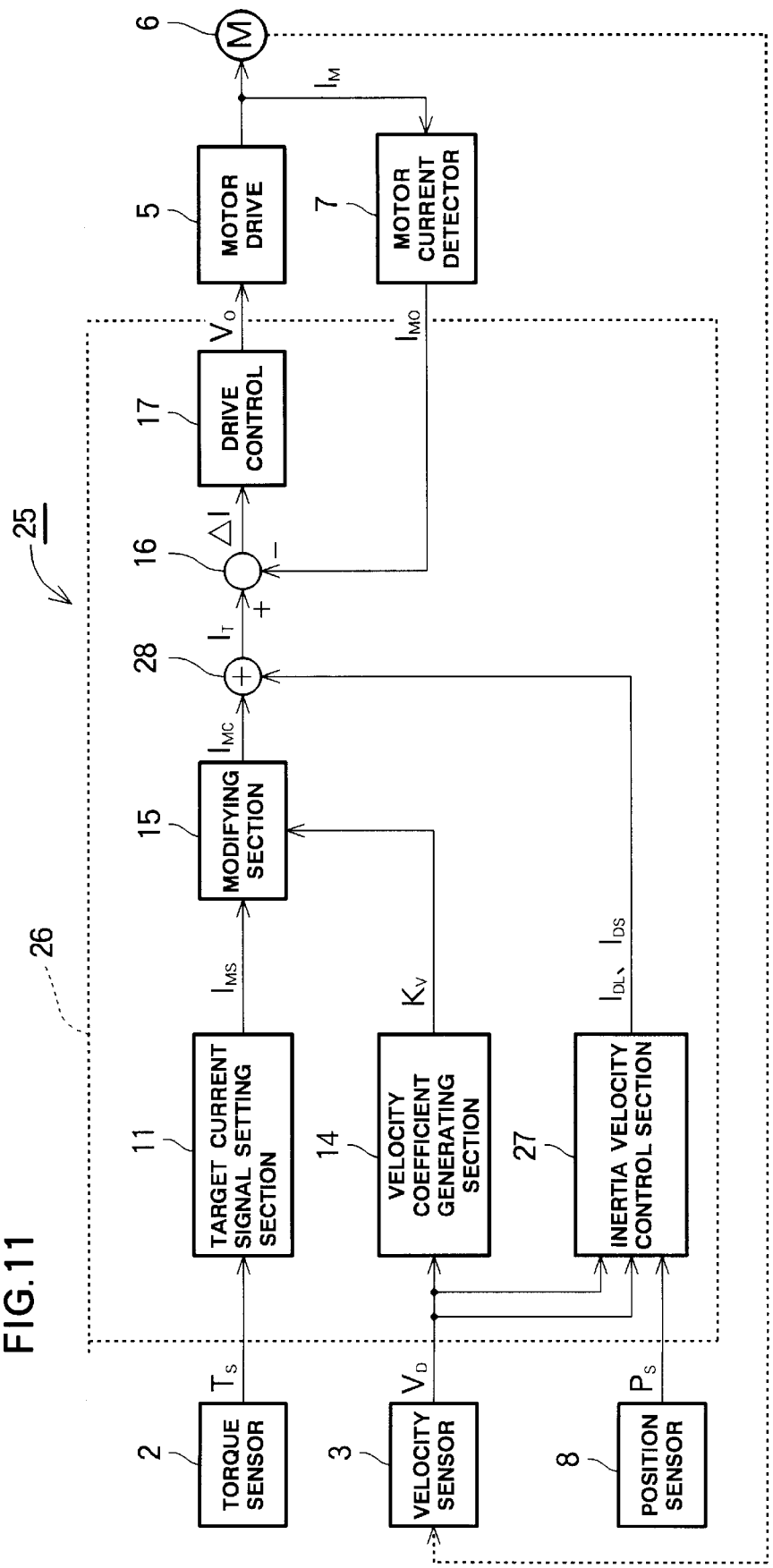
FIG. 11 is a block diagram illustrating an overall arrangement of a vehicle door operating apparatus in accordance with a third embodiment of the present invention.

FIG. 11 is a block diagram illustrating an overall arrangement of a vehicle door operating apparatus 25 in accordance with a third embodiment of the present invention. The vehicle door operating apparatus 25 in accordance with the third embodiment is arranged to achieve a natural opening/closing movement of the vehicle door, by controlling the velocity of the door moving by inertia when a human puts his or her hand off (i.e., stops depressing) the door knob during the opening/closing operation of the door.

To this end, the vehicle door operating apparatus 25 comprises a controller unit 26 which includes a target current signal setting section 11, a velocity coefficient generating section 14, a modifying section 15, an inertia velocity control section 27, an adder 28, an offset calculating section 16 and a drive control section 17. The vehicle door operating apparatus 25 further comprises a position sensor 8 for detecting a current position of the vehicle door being moved. A torque sensor 2, velocity sensor 3, motor drive 5 and motor current detector 7 in the third embodiment of FIG. 11 are the same in structure and behavior as the counterparts in the first embodiment of FIG. 1 and hence will not be described in detail here to avoid unnecessary duplication. Also, the target current signal setting section 11, velocity coefficient generating section 14, modifying section 15, offset calculating section 16 and drive control section 17 of the controller unit 26 in the third embodiment are the same in structure and behavior as the counterparts in the first embodiment and hence will not be described in detail here.

The inertia velocity control section 27 receives digitally-converted values of torque signal $T_S$ and velocity signal $V_D$ and a digitally-converted value of position signal $P_S$ supplied from the position sensor 8. Thus, the inertia velocity control section 27 determines on the basis of the torque signal $T_S$ and velocity signal $V_D$ that the door movement is in an inertia mode, and ascertains whether the velocity signal $V_D$ is greater than a reference value. If the vehicle door movement is in the inertia mode and the velocity signal $V_D$ is greater than the reference value, this section 27 outputs current signal $I_{DL}$ representative of a sum of an offset current signal, corresponding to an offset of the velocity signal $V_D$ from the reference value, and a target inertia current signal corresponding to a target velocity in the inertial mode; if, on the other hand, the vehicle door movement is in the inertia mode and the velocity signal $V_D$ is not greater than the reference value, this section 27 outputs attenuating current signal $I_{DS}$ to the adder 28.

The adder 28 adds together the modified current signal $I_{MC}$, representative of a product between target current signal $I_{MS}$ and velocity coefficient $K_V$ fed from the modifying section 15 ($I_{MC}=K_V*I_{MS}$), and the current signal $I_{DL}$ or attenuating current signal $I_{DS}$, so as to generate added current signal $I_T$ to be fed to the offset calculating section 16. In the inertia mode, the target current signal $I_{MS}$ is of value "0", so that the added current signal $I_T$ equals the current signal $I_{DL}$ or attenuated current signal $I_{DS}$; on the other hand, in the normal mode, the current signal $I_{DL}$ or attenuating current signal $I_{DS}$ takes a value "0", so that the added current signal $I_T$ equals the target current signal $I_{MS}$.

By virtue of the provision of the above-described inertia velocity control section 27 which controls the velocity of the moving vehicle door when a human stops depressing the door knob during the opening/closing operation of the door, the controller 26 allows the opening/closing movement of the door to appropriately continue automatically depending on the detected velocity of the moving door.

Figure 12:
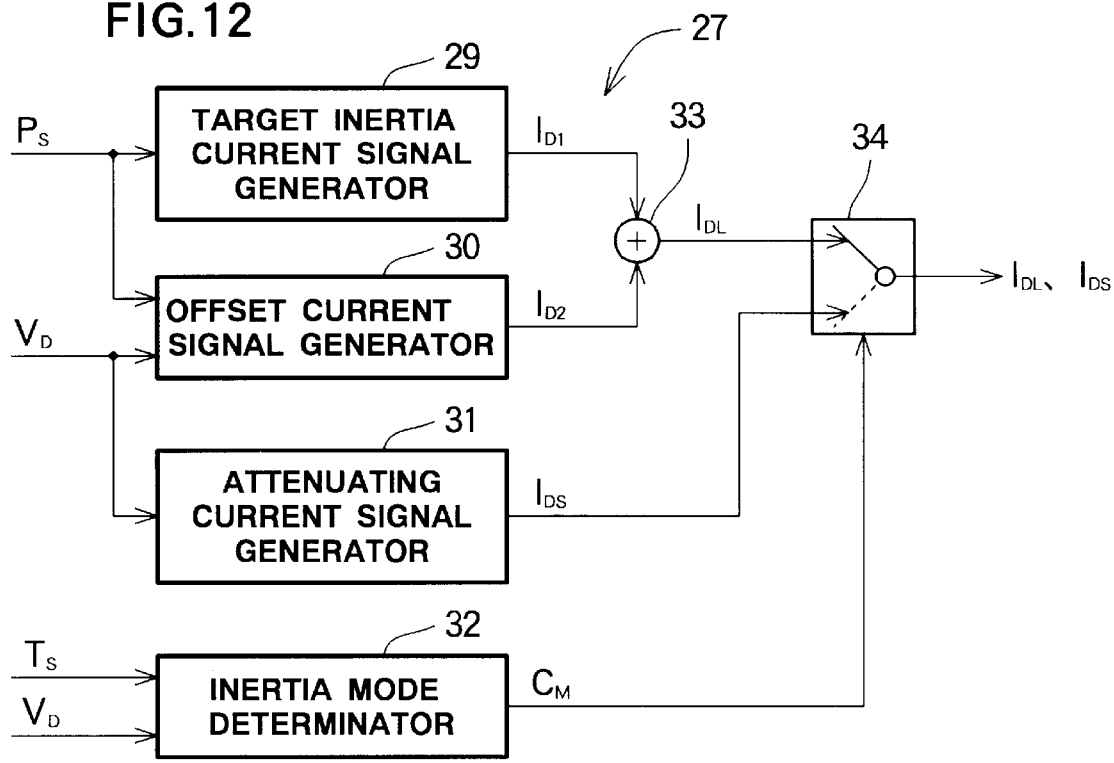
FIG. 12 is a diagram showing a detailed example of an inertia velocity control section shown in FIG. 11.
Figure 13:
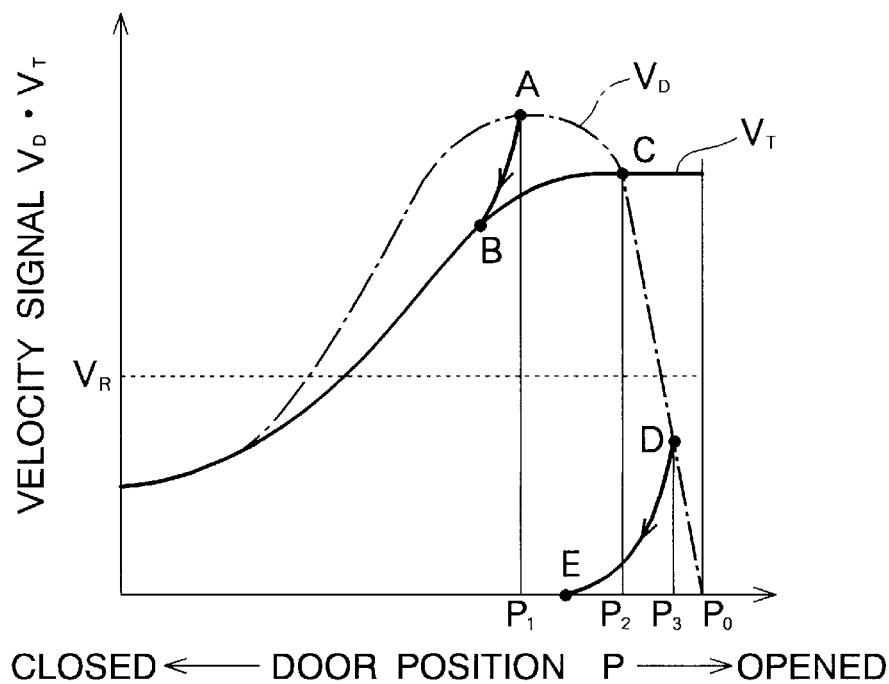
FIG. 13 is a graph illustrating control characteristics of door position P vs velocity signal $V_D$, $V_T$ used for inertia velocity control in the third embodiment.

FIG. 12 is a block diagram showing a detailed example of the inertia velocity control section 27, which includes a target inertia current signal generator 29, an offset current signal generator 30, an attenuating current signal generator 31, an inertia mode determinator 32, an adder 33 and a switch 34. The target inertia current signal generator 29 includes a memory, such as a ROM, prestoring a set of values of target inertia current signal (standard current signal) $I_{D1}$ corresponding to possible values of door position signal $P_S$ previously determined empirically. In response to door position signal $P_S$ supplied from the position sensor 8, the target inertia current signal generator 29 reads out a value of target inertia current signal $I_{D1}$ corresponding to the supplied door position signal $P_S$ and feeds the read-out value of target inertia current signal $I_{D1}$ to the adder 33. Note that the values of target inertia current signal $I_{D1}$ corresponding to possible values of door position signal $P_S$ may be determined arithmetically, through simulation or the like, while changing the target inertia current signal $I_{D1}$ to coincide with target velocity $V_T$ of the vehicle door for every door position P as shown in FIG. 13.

The offset current signal generator 30 includes an attenuating function calculator and a memory such as a ROM and receives the door position signal $P_S$ and velocity signal $V_D$. The attenuating function calculator calculates velocity $V_D$ of the moving vehicle door at a specific time point when a human stops depressing the door knob, as well as an offset or difference $\Delta V$ between the velocity $V_D$ and target velocity $V_T$ for the door position P detected at the specific time point ($\Delta V = V_D - V_T$). The memory prestores values of offset current signal $I_{D2}$, each representative of a product between current signal $I_{D0}$ (not shown) and exponential function ($e^{-KT}$ or $1-e^{-KT}$), corresponding to various possible values of the offset velocity $\Delta V$. When position signal $P_S$ and velocity signal $V_D$ are supplied, the offset current signal generator 30 reads out from the memory a corresponding value of offset current signal $I_{D2}$ and feeds the read-out value to the adder 33. A sum of the target inertia current signal $I_{D1}$ and offset current signal $I_{D2}$ calculated by the adder 33 is delivered, as added current signal $I_{DL}$, to the switch 34.

For example, when the offset velocity $\Delta V$ is of positive value ($V_D > V_T$), a product between a value of current signal $I_{D0}$ corresponding to the offset velocity $\Delta V$ and exponential function ($e^{-KT}$) is output as the offset current signal $I_{D2}$ to attenuate the current signal $I_{D0}$ over time. Conversely, when the offset velocity $\Delta V$ is of negative value ($V_D < V_T$), a product between a value of current signal $I_{D0}$ corresponding to the offset velocity $\Delta V$ and exponential function ($1-e^{-KT}$) is output as the offset current signal $I_{D2}$ to increase the value of the current signal $I_{D0}$ over time.

The offset current signal generator 30 further includes a comparator for comparing velocity signal $V_D$ and target velocity $V_T$. Thus, when the electric motor 6 of FIG. 11 is driven on the basis of offset current signal $I_{D2}$ to increase or reduce the door velocity until the velocity signal $V_D$ equals the target velocity $V_T$, the offset current signal generator 30 can stop outputting the offset current signal $I_{D2}$.

Although not specifically shown, the inertia velocity control section 27 includes a sequencer, which controls the operating sequence of the target inertia current signal generator 29 and offset current signal generator 30 in such a manner that the offset current signal generator 30 is first activated to output the offset current signal $I_{D2}$ and then deactivated once the velocity signal $V_D$ equals the target velocity $V_T$ and next the target inertia current signal generator 29 is activated to output the target inertia current signal $I_{D1}$.

The attenuating current signal generator 31 includes a memory, such as a ROM, and an attenuating function generator (e.g., generator for yielding exponential function $e^{-KT}$). The memory prestores such values of current signal $I_{DP}$ (not shown), arithmetically determined through simulation or the like, that will coincide with velocity signal $V_D$ at a specific time point when a human stops depressing the door knob. Thus, when velocity signal $V_D$ is supplied, the attenuating current signal generator 31 reads out a corresponding value of current signal $I_{DP}$ and multiplies the read-out value by the exponential function $e^{-KT}$ to generate attenuating current signal $I_{DS}$ ($=I_{DP}*e^{-KT}$) that is then delivered to the switch 34.

The inertia mode determinator 32 includes a comparator which determines on the basis of the torque signal $T_S$ and velocity signal $V_D$ that the door movement is in the inertia mode. In the inertia mode, the inertia mode determinator 32 controls the target inertia current signal generator 29, offset current signal generator 30 and attenuating current signal generator 31 to be in an activated or ON condition.

A reference velocity value $V_R$ is preset in the inertia mode determinator 32 so as to compare the velocity signal $V_D$ with the reference velocity value $V_R$. When the velocity signal $V_D$ is greater than the reference velocity value $V_R$ ($V_D > V_R$), the inertia mode determinator 32 generates determination signal $C_M$ of, for example, H level, but when the velocity signal $V_D$ is not greater than the reference velocity value $V_R$ ($V_D < V_R$), the inertia mode determinator 32 generates determination signal $C_M$ of, for example, L level, so as to control the switching action of the switch 34. The determination of the inertial mode is effected provided that the velocity signal $V_D$ is of finite value at a time point when the torque signal $T_S$ supplied to the inertia mode determinator 32 shifts from a finite value to "0", i.e., provided that a human has stopped depressing the door knob.

The switch 34 comprises an electronic switch or software-controlled switch, which, in accordance with the determination signal $C_M$ supplied from the inertia mode determinator 32, selectively outputs the added current signal $I_{DL}$ from the adder 33 or the attenuating current signal $I_{DS}$ from the inertia mode determinator 32 to the adder 28 shown in FIG. 11.

FIG. 13 is a plot of relationships between door position P and velocity signals $V_D$ and $V_T$ used for the inertia velocity control. First, consider a case where a human stops depressing the door knob at point A (door position $P_1$) of the velocity signal $V_D$ curve in FIG. 13. Because the velocity signal $V_D$ is greater than the reference velocity value $V_R$ at point A in the inertia mode, offset current signal $I_{D2}$ ($=I_{D0}*e^{-KT}$) is output as current signal $I_{DL}$ from the offset current signal generator 30 of the inertia velocity control section 27 and the electric motor 6 of FIG. 11 is driven on the basis of attenuating offset current signal $I_{D2}$ ($=I_{D0}*e^{-KT}$), thus gradually reducing the door velocity. Then, once the velocity signal $V_D$ coincides with the target velocity $V_T$ (point A shifts to point B), output of the offset current signal $I_{D2}$ is stopped and target inertia current signal $I_{D1}$ is output as current signal $I_{DL}$ from the target inertia current signal generator 29, so that the electric motor 6 is driven on the basis of the current signal $I_{DL}$ and thus the door is automatically moved at the target velocity $V_T$ to the fully-open or fully-closed position.

Next, consider a case where a human stops depressing the door knob at point C (door position $P_2$) of the velocity signal $V_D$ curve in FIG. 13. Because the velocity signal $V_D$ is equal to the reference velocity value $V_R$ at point C in the inertia mode, only the target inertia current signal generator 29 is activated and target inertia current signal $I_{D1}$ is output therefrom as current signal $I_{DL}$, so that the electric motor 6 is driven on the basis of the current signal $I_{DL}$ and thus the door is automatically moved at the target velocity $V_T$ to the fully-open or fully-closed position.

Next, consider a case where a human stops depressing the door knob at point D (door position $P_3$) of the velocity signal $V_D$ curve in FIG. 13. Because the velocity signal $V_D$ is smaller than the reference velocity value $V_R$ at point D in the inertia mode, only the attenuating current signal generator 31 is activated and attenuating current signal $I_{DS}$ is output therefrom, so that the electric motor 6 is driven on the basis of the attenuating current signal $I_{DS}$ decreasing to a value "0" over time and thus the door is caused to slowly stop in the vicinity of position $P_3$ where the human stops depressing the door knob.

The inertia velocity control section 27 is characterized by inclusion therein the above-described inertia mode determinator 32, target inertia current signal generator 29, offset current signal generator 30 and attenuating current signal generator 31. Thus, when the torque signal is of value "0" and the velocity signal $V_D$ is greater than the reference velocity value $V_R$, the electric motor 6 is driven first on the basis of offset current signal $I_{D2}$ and then on the basis of standard current signal $I_{D1}$ and the vehicle door can be automatically opened or closed at preset standard velocity $V_T$. Further, when the torque signal is of value "0" and the velocity signal $V_D$ is not greater than the reference velocity value $V_R$, the electric motor 6 is driven on the basis of attenuating current signal $I_{DS}$ and thus the door can be moved at an attenuating velocity.

Whereas the embodiment has been described as setting a target inertia current value corresponding to a target velocity, control may be performed such that velocity itself is fed back to approach the target velocity.

Figure 14:
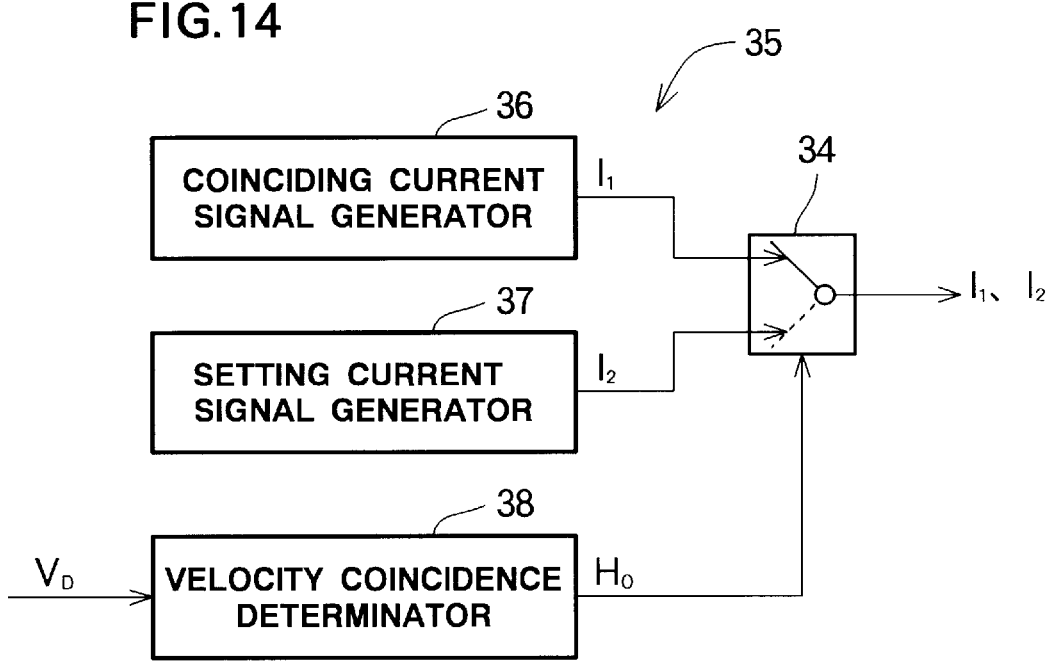
FIG. 14 is a block diagram illustrating a modification of the inertia velocity control section shown in FIG. 12.

FIG. 14 is a block diagram illustrating a modification of the inertia velocity control section 27 shown in FIG. 12. This modified inertia velocity control section 35 includes a coinciding current signal generator 36, a setting current signal generator 37 and a velocity coincidence determinator 38. The coinciding current signal generator 36 has an inertia mode determinator 32, similar to that shown in FIG. 12, for determining that the door movement is in the inertia mode, and a memory prestoring various values of current signal $I_N$ (not shown) corresponding to possible values of velocity signal $V_D$. When the door movement is in the inertia mode and the velocity signal $V_D$ is greater than the reference velocity value $V_R$, the coinciding current signal generator 36 supplies the switch 34 with coinciding current signal $I_1$ ($=I_N*e^{-KP}$) attenuated with an attenuating function (e.g., $e^{-KP}$) ($I_1=I_N*e^{-KP}$).

Coefficient K and distance P of the exponential function $e^{-KP}$ are set such that the door velocity signal $V_D$ when the electric motor 6 is driven on the basis of the coinciding current signal $I_1$ ($=I_N*e^{-KP}$) always coincides with the reference velocity value $V_R$ at door position $P_Z$ irrespective of a value of the coinciding current signal $I_1$ or door position P ($P_W$, $P_X$, $P_Y$) where the coinciding current signal $I_1$ is output in a plot of a relationship between door position P and velocity signal $V_D$ as shown in FIG. 15.

For example, coefficient K is set to be inversely proportional to an offset distance from given door position P ($P_W$, $P_X$, $P_Y$) to door position $P_Z$ and directly proportional to an absolute value of the current signal $I_N$. By thus properly setting coefficient K and distance P of the exponential function $e^{-KP}$, coincidence can be attained at point Z where the velocity signal $V_D$ equals the reference velocity value $V_R$ even when a human stops depressing the door knob at any of points W, X and Y of the velocity signal $V_D$ curve corresponding to door positions $P_W$, $P_X$ and $P_Y$.

The setting current signal generator 37 includes a memory prestoring values of setting current signal $I_2$ that result in a predetermined attenuation pattern when the velocity signal $V_D$ is not greater than the reference velocity value $V_R$, so that the generator 37 supplies the setting current signal $I_2$ to the switch 34 when the velocity signal $V_D$ coincides with the reference velocity value. By driving the electric motor 6 on the basis of the setting current signal $I_2$, the velocity signal $V_D$ beyond door position $P_Z$ can be set to a predetermined attenuation pattern of gradually decreasing values.

The velocity coincidence determinator 38 comprises a comparator having the reference velocity value $V_R$ preset therein, so that once the velocity signal $V_D$ coincides with the reference velocity value $V_R$ ($V_D=V_R$), the determinator 38 can supply the switch 34 with determination signal $H_0$ of, for example, H level, to control the switching action of the switch 34. For example, when the velocity signal $V_D$ is greater than the reference velocity value $V_R$ ($V_D>V_R$), the switch 34 selects the coinciding current signal $I_1$ supplied from the coinciding current signal generator 36, but when the velocity signal $V_D$ is equal to the reference velocity value $V_R$ ($V_D=V_R$), the switch 34 selects the setting current signal 2 supplied from the setting current signal generator 37.

The modified inertia velocity control section 35 is characterized by the inclusion therein of the above-described coinciding current signal generator 36 and setting current signal generator 37. Thus, when the torque signal is of value "0" and the velocity signal $V_D$ is greater than the reference velocity value $V_R$, the electric motor 6 of FIG. 11 can be driven on the basis of the coinciding current signal $I_1$ to allow the velocity signal $V_D$ to coincide with the reference velocity value $V_R$ at predetermined point $P_Z$; besides, the velocity after predetermined point $P_Z$ can be set to a predetermined attenuation pattern by driving the electric motor 6 on the basis of the setting current signal $I_2$. As a result, the door velocity near the fully-open or fully-closed position can be maintained at a constant value, irrespective of a door velocity before the human stops depressing the door knob.

By virtue of the above-described arrangements, the present invention affords various superior benefits as set forth below:

First, the vehicle door operating apparatus of the present invention is characterized in that the modifying section generates a modified current signal on the basis of a target current signal corresponding to torque applied to the vehicle's door knob, an acceleration coefficient output from the acceleration coefficient generating section in response to a detected acceleration of the vehicle and a velocity coefficient output from the velocity coefficient generating section in response to a detected velocity of the vehicle and that the electric motor is driven on the basis of the modified current signal to yield a power assist. With this arrangement, the vehicle door operating apparatus of the present invention can provide a proper power assist faithfully based on detection of human's door opening/closing operation.

Further, the vehicle door operating apparatus of the present invention is characterized in that the modifying section is arranged to output the modified current signal only when both the acceleration coefficient and the velocity coefficient are simultaneously supplied. Thus, when any of the target current signal, acceleration coefficient and velocity coefficient is not supplied, no modified current signal is output, so that impartment of a power assist to the door opening/closing operation is inhibited. With this simple arrangement, it is possible to prevent an unwanted automatic opening/closing movement of the vehicle door that would otherwise occur when an erroneous torque signal is generated by a broken or malfunctioning torque sensor.

Further, because the acceleration coefficient generating section and velocity coefficient generating section are arranged to output acceleration and velocity coefficients that decrease in value in response to increase in the value of acceleration and velocity signals, a power assist to be imparted can be controlled to properly limit the door velocity even when the door is operated with a great or abruptly changing force. Thus, it is possible to achieve a natural opening/closing movement of the vehicle door that well fits human feelings.

Furthermore, because the acceleration coefficient generating section and velocity coefficient generating section are each provided with a comparator and arranged to set the acceleration and velocity coefficients to zero when the acceleration signal and velocity signals are both below predetermined values, a power assist can be imparted only after the operated door has started moving steadily. This arrangement also permits a natural opening/closing movement of the vehicle door.

Moreover, the the vehicle door operating apparatus of the present invention is characterized in that the driving/braking velocity coefficient generating section outputs a positive velocity coefficient when the velocity signal is not greater than the predetermined velocity value but outputs a negative velocity coefficient once the velocity signal exceeds the predetermined velocity value. Thus, once the door velocity exceeds the predetermined velocity value, it is possible to appropriately brake (i.e., limit the velocity of) the moving vehicle door by driving the electric motor in the reverse direction that is opposite to the door operating direction. This arrangement allows the door to be opened or closed at a generally constant velocity, irrespective of the magnitude of a human-applied force to open or close the vehicle door.

Furthermore, because the driving/braking velocity coefficient generating section includes the velocity coefficient memory prestoring a set of velocity coefficients corresponding to possible values of the velocity signal, it is possible to achieve a desired door-velocity limiting or braking characteristic by just changing the setting of the velocity coefficient. This arrangement also permits a natural opening/closing movement of the vehicle door.

In addition, the vehicle door operating apparatus of the present invention is characterized in that the inertia velocity control section controls the velocity of the moving vehicle door when a human stops depressing the door knob during the opening/closing operation of the door. Such control by the control section allows the opening/closing movement of the door to appropriately continue automatically depending on the detected velocity of the moving door. This arrangement achieves a highly convenient opening/closing movement of the vehicle door.

Furthermore, the vehicle door operating apparatus of the present invention is characterized by the provision of the inertia velocity control section, which includes the inertia mode determinator, target inertia current signal generator, offset current signal generator and attenuating current signal generator. When the torque signal is of value "0" and the velocity signal is greater than the reference velocity value, the electric motor is driven first on the basis of an offset current signal and then on the basis of a standard current signal and the vehicle door can be automatically opened or closed at a preset standard velocity. Further, when the torque signal is of value "0" and the velocity signal is not greater than the reference velocity value, the electric motor is driven on the basis of an attenuating current signal and thus the door can be moved at an attenuating velocity. This arrangement also permits a natural opening/closing movement of the vehicle door.

In addition, the inertia velocity control section is characterized by the inclusion therein of the coinciding current signal generator and setting current signal generator. Thus, when the torque signal is of value "0" and the velocity signal is greater than a reference velocity value, the electric motor 6 can be driven on the basis of a coinciding current signal to allow the velocity signal to coincide with the reference velocity value at a predetermined point; besides, the velocity after predetermined point can be set to a predetermined attenuation pattern by driving the electric motor on the basis of a setting current signal. As a result, the door velocity near the fully-open or fully-closed position can be maintained at a constant value, irrespective of a door velocity before the human stops depressing the door knob.

With the above-described arrangements, the present invention provides a vehicle door operating apparatus which is very simple in construction and yet achieves a highly convenient and natural opening/closing movement of the vehicle door that well fits human feelings.

What is claimed is:

1. A vehicle door operating apparatus comprising a torque sensor for detecting torque applied to a knob of a vehicle door to generate a torque signal, an electric motor for imparting a power assist to an opening/closing movement of the vehicle door, and a controller unit for controlling the electric motor on the basis of at least the torque signal generated by the torque sensor, said vehicle door operating apparatus further comprising a velocity sensor for detecting a moving velocity of the vehicle door to generate a velocity signal, said controller unit including:

a target current signal setting section for generating a target current signal corresponding to the torque signal;

an acceleration calculating section for performing an arithmetic operation to differentiate the velocity signal generated by said velocity sensor so as to generate an acceleration signal;

an acceleration coefficient generating section for generating an acceleration coefficient corresponding to the acceleration signal generated by said acceleration calculating section;

a velocity coefficient generating section for generating a velocity coefficient corresponding to the velocity signal;

a modifying section for modifying the target current signal on the basis of the acceleration coefficient and velocity coefficient so as to generate a modified current signal; and a drive control section for generating a control signal on the basis of the modified current signal generated by said modifying section.

2. A vehicle door operating apparatus as defined in claim 1 wherein said modifying section outputs the modified current signal only when the target current signal, acceleration coefficient and velocity coefficient are simultaneously supplied.

3. A vehicle door operating apparatus as defined in claim 1 wherein the acceleration coefficient output from said acceleration coefficient generating section decreases in value as the acceleration signal increases in magnitude value.

4. A vehicle door operating apparatus as defined in claim 1 wherein the velocity coefficient output from said velocity coefficient generating section decreases in value as the velocity signal increases in magnitude value.

5. A vehicle door operating apparatus as defined in claim 1 wherein said acceleration coefficient generating section includes a comparator and sets the acceleration coefficient to a value 0 when said comparator indicates that the acceleration signal is not greater than a predetermined value.

6. A vehicle door operating apparatus as defined in claim 1 wherein said velocity coefficient generating section includes a comparator and sets the velocity coefficient to a value 0 when said comparator indicates that the velocity signal is not greater than a predetermined value.

7. A vehicle door operating apparatus comprising a torque sensor for detecting torque applied to a knob of a vehicle door to generate a torque signal, an electric motor for imparting a power assist to an opening/closing movement of the vehicle door, and a controller unit for controlling the electric motor on the basis of at least the torque signal generated by the torque sensor, said vehicle door operating apparatus further comprising a velocity sensor for detecting a moving velocity of the vehicle door to generate a velocity signal, said controller unit including:

a target current signal setting section for generating a target current signal corresponding to the torque signal;

a driving/braking velocity coefficient generating section for outputting a positive velocity coefficient when the velocity signal is not greater than a predetermined value but outputting a negative velocity coefficient when the velocity signal is greater than the predetermined value;

a modifying section for modifying the target current signal on the basis of the velocity coefficient so as to generate a modified current signal; and a drive control section for generating a control signal on the basis of the modified current signal generated by said modifying section.

8. A vehicle door operating apparatus as defined in claim 7 wherein said driving/braking velocity coefficient generating section includes a velocity coefficient memory prestoring positive and negative coefficients corresponding to various possible values of the velocity signal.

9. A vehicle door operating apparatus comprising a torque sensor for detecting torque applied to a knob of a vehicle door to generate a torque signal, an electric motor for imparting a power assist to an opening/closing movement of the vehicle door, and a controller unit for controlling the electric motor on the basis of at least the torque signal generated by the torque sensor, said vehicle door operating apparatus further comprising a velocity sensor for detecting a moving velocity of the vehicle door to generate a velocity signal, and a position sensor for detecting a position of the vehicle door, said controller unit including:

a target current signal setting section for generating a target current signal corresponding to the torque signal;

a velocity coefficient generating section for generating a velocity coefficient corresponding to the velocity signal;

a modifying section for modifying the target current signal on the basis of the velocity coefficient so as to generate a modified current signal;

a drive control section for generating a control signal on the basis of the modified current signal generated by said modifying section; and an inertia velocity control section for controlling a moving velocity of the vehicle door when a human stops depressing the knob of the vehicle door during an opening/closing movement of the vehicle door.

10. A vehicle door operating apparatus as defined in claim 9 wherein said inertia velocity control section includes an inertia mode determinator for determining that the opening/closing movement of the vehicle door is in an inertial mode, a target inertia current signal generator for generating a standard current signal corresponding to a target velocity for the inertia mode, an offset current signal generator for generating an offset current signal corresponding to a difference between the velocity signal and the target velocity, and an attenuating current signal generator for generating an attenuating current signal to attenuate the velocity signal to a value 0, and wherein when the torque signal is of value 0 and the velocity signal is greater than a reference value, said electric motor is driven on the basis of the standard current signal and offset current signal, but when the torque signal is of value 0 and the velocity signal is not greater than the reference value, said electric motor is driven on the basis of the attenuating current signal.

11. A vehicle door operating apparatus as defined in claim 9 wherein said inertia velocity control section includes a coinciding current signal generator for generating a coinciding current signal to allow the velocity signal to coincide with a reference velocity value when the vehicle door is at a predetermined position, and a setting current signal generator for generating a setting current signal to set attenuation of the velocity signal, not greater than the reference velocity value, to a predetermined attenuation pattern, and wherein when the torque signal is of value 0 and the velocity signal is greater than the reference velocity value, said electric motor is driven first on the basis of the coinciding current signal and then on the basis of the setting current signal.

* * * * *